Patented Dec. 2, 1941

2,264,354

UNITED STATES PATENT OFFICE 2,264,354

ADDITION PRODUCTS OF DIENES AND UNSATURATED ESTERS, KETONES, OR NITRILES

Kurt Alder, Cologne-Deutz, and Hans-Ferdinand Rickert, Cologne, Rhine, Germany, assignors to I. G. Farbenindustrie Aktiengesellschaft, Frankfort-on-the-Main, Germany No Drawing. Application December 17, 1938, Serial No. 246,493. In Germany December 22, 1937

8 Claims. (Cl. 260—464)

The present invention relates to new addition products and to the process of preparing the same.

It has been found that new condensation products can be prepared by causing compounds containing two conjugated C=C double linkages to react upon compounds of the following formula:

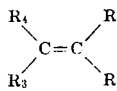

wherein $R_1$ and $R_2$ stand for a member of the group consisting of CN, acyl and an esterified carboxylic acid group,
$R_3$ stands for a member of the group consisting of hydrogen, CN, acyl and an esterified carboxylic acid group and
$R_4$ stands for a member of the group consisting of alkyl, oxalkyl, aryl, CN, acyl and an esterified carboxylic acid group.

The reaction is performed at an elevated temperature, say at about 170–180° with or without the presence of a solvent. As compounds containing 2 conjugated C=C double linkages there may be mentioned butadiene-1.3, isoprene, 2.3-dimethylbutadiene, cyclopentadiene and cyclohexadiene. Examples for the other reaction components falling within the above definition are the products of the condensation of aldehydes and acetyl acetic acid esters or malonic acid esters, furthermore, ethylene-tetra-carboxylic acid esters, the corresponding nitriles, and furthermore, the products of the condensation of aldehydes and 1.3-diketones such as acetylacetone. As butadiene, isoprene and 2.3-dimethylbutadiene are also capable of being polymerized, we prefer to work in the presence of polymerization inhibitors such as pyrogallol and the like. Generally speaking, the reaction is to be performed under such conditions as to prevent any substantial polymerization. The even course of the reaction is the more surprising as according to the hitherto experiences the tendency of olefines to form addition products with butadienes, cyclopentadiene and the like decreases with an increase of the number and weight of the substituents attached to the ethylene group.

The resulting addition products are capable of reacting with a further molecule of the compound containing two conjugated double linkages.

The following examples illustrate the present invention without, however, restricting it thereto, the parts being by weight:

Example 1

200 parts of ethylidene-malonic acid diethyl ester and 95 parts of 2.3-dimethyl-butadiene are heated in an autoclave for 12 hours at 170–180°. On distilling the reaction product in vacuo, there is obtained at 11 mm. a mass consisting of unchanged ethylidene malonic acid ester and dimeric 2.3-dimethylbutadiene.

The crude addition product of the components obtained in a yield of 230 parts boils at 135–150° and on further distillation at 148–150° (11 mm. pressure). The compound probably corresponds to the following constitution:

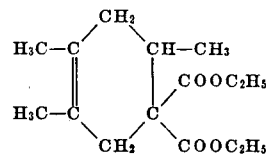

Example 2

When replacing in the preceding example the 2.3-dimethylbutadiene by butadiene the addition product is obtained in form of a transparent oil of boiling point 133–135° under 11 mm. pressure. It corresponds to the following constitution:

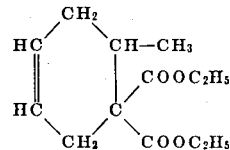

When hydrogenizing this compound in the presence of platinum oxide and acetic acid ester, the 6-methyl-cyclohexane-1.1-dicarboxylic acid diethyl ester (see Journal of the Chemical Society 53, page 206) is formed, 2 hydrogen atoms being taken up.

Example 3

60 parts of ethylidene-acetic acid ester and 40 parts of 2.3-dimethyl-butadiene are heated in an autoclave for 12 hours to 170–180°. On distilling the reaction product in vacuo, there is obtained in a yield of 76 parts at 135° (under 12 mm. pressure) the addition product of the components in form of a colorless oil of boiling point 139–141°. It probably corresponds to the following constitution:

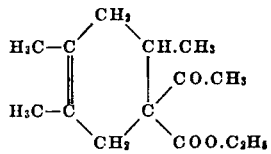

Example 4

60 parts of ethylidene acetic acid and 50 parts of butadiene are heated in an autoclave for 12 hours to 170–180°. On distilling the reaction product in vacuo there is obtained besides some dimeric butadiene the addition product in form of a colorless oil of boiling point 126–128° (12 mm. pressure) which probably corresponds to the following constitution:

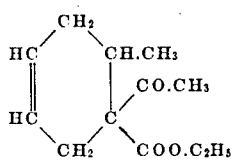

On hydrogenating this compound while employing platinum oxide as catalyst in the presence of an acetic acid ester an amount of hydrogen is taken up which corresponds to a single double linkage. The saturated ester has the boiling point 127–129° at 12 mm. pressure.

Example 5

29 parts of ethylidene-cyano acetic acid ester and 24 parts of 2.3-dimethyl-butadiene are heated in an autoclave to 170–180°. On distilling in vacuo the addition product is obtained in a yield of 32 parts which boils at 145–147° under 11 mm. pressure. It probably corresponds to the following constitution:

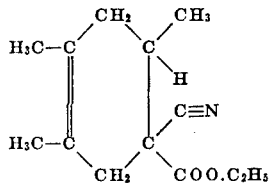

Example 6

The addition of benzylidene-malonic acid ester and 2.3-dimethylbutadiene occurs at 170–180°. On distilling off the unchanged starting material and the dimeric hydrocarbon in vacuo the addition product is isolated in form of the free acid by saponification with alcoholic potassium hydroxide. On recrystallizing from a mixture of acetic acid ester and benzine it melts at 190° while decomposing. The acid probably corresponds to the following formula:

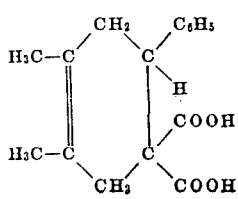

Example 7

220 parts of ethylidene malonic acid diethyl ester and 78 parts of cyclopentadiene are heated for 12 hours at 170–180°. On distillation in vacuo under 12 mm. pressure there is obtained besides small amounts of dicyclopentadiene and unchanged ethylidene malonic acid ester the addition product of the components in form of a colorless oil of boiling point 138–139°. It probably corresponds to the following constitution:

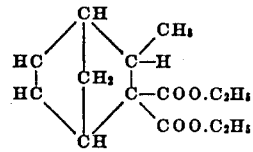

With phenylazide it yields a hydrotriazol of melting point 159°.

Furthermore, the following ester is obtained in smaller amounts as by-product which has formed by the addition of a further molecule of cyclopentadiene to the above described chief product:

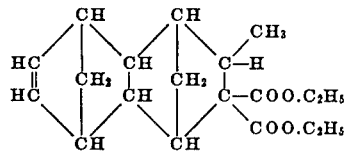

It shows the boiling point 191–193° at 12 mm. pressure.

Example 8

62 parts of ethoxymethylene acetic acid ester and 40 parts of 2.3-dimethylbutadiene are heated in an autoclave for 12 hours to 170–180°. On distilling the reaction product in vacuo the addition product of the components is obtained in form of a colorless oil of boiling point 153–155° (12 mm. pressure). The product gradually solidifies to a crystal mass of melting point 37°, which probably corresponds to the following constitution:

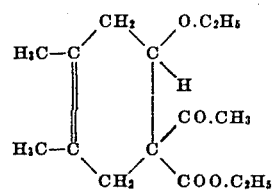

Example 9

57 parts of ethylene-tetracarboxylic acid tetraethyl ester and 20 parts of dimethyl butadiene are heated in an autoclave for 7 hours to 170–180°. On distilling in vacuo 62 parts of the addition product are obtained in form of a colorless oil of boiling point 150–153° at 0.1 mm. pressure. The compound probably corresponds to the following constitution:

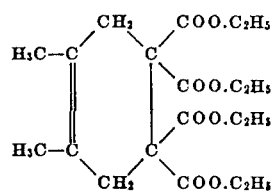

Example 10

40 parts of ethylene-tetracarboxylic acid-tetraethyl ester and 30 parts of butadiene are heated for 8 hours in an autoclave to 170–180°.

On distilling the dimeric butadiene in vacuo the ester of the following constitution is obtained:

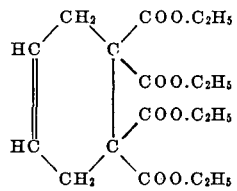

which boils at 148–152° at 0.6 mm. pressure. On hydrogenating in the presence of platinum oxide in acetic acid ester, hydrogen is taken up in an amount corresponding to one double linkage. The hydrogenation product boils at 190–192° at 14 mm. pressure.

*Example 11*

30 parts of benzylidene-malonic acid dinitrile and 18 parts of 2.3-dimethyl-butadiene are heated to 185–195° with the addition of 20–30 parts of benzene as solvent and kept at this temperature for 10 hours. On evaporating the solvent and distilling in vacuo 42 parts of the addition product are obtained which boils at 155–156 under 2 mm. pressure. It probably corresponds to the following constitution:

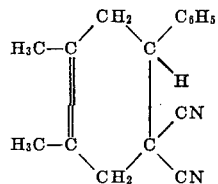

We claim:

1. The process which comprises causing a hydrocarbon containing two conjugated double linkages to react at an elevated temperature upon ethylenes, both hydrogens of at least one ethylene-carbon atom being substituted by radicals containing a double bond in conjugation with the ethylene double bond, radicals with C=C double bonds being excluded, the reaction being performed under such conditions as to prevent any substantial polymerization.

2. The process which comprises causing a hydrocarbon containing two conjugated double linkages to react at an elevated temperature upon ethylene-$\alpha,\alpha$-dicarboxylic acid esters in which at least one hydrogen attached to the beta carbon atom is replaced by a hydrocarbon radical, the reaction being performed under such conditions as to prevent any substantial polymerization.

3. The process which comprises causing a hydrocarbon containing two conjugated double linkages to react at an elevated temperature upon ethylene-$\alpha,\alpha$-dicarboxylic acid esters in which at least one hydrogen attached to the beta carbon atom is replaced by an alkyl radical, the reaction being performed under such conditions as to prevent any substantial polymerization.

4. The process which comprises causing a hydrocarbon containing two conjugated double linkages to react at an elevated temperature upon ethylene-$\alpha,\alpha$-dicarboxylic acid dinitriles in which at least one hydrogen attached to the beta carbon atom is replaced by a hydrocarbon radical, the reaction being performed under such conditions as to prevent any substantial polymerization.

5. The process which comprises causing a hydrocarbon containing two conjugated double linkages to react at an elevated temperature upon ethylene-$\alpha,\alpha$-dicarboxylic acid dinitriles in which at least one hydrogen attached to the beta carbon atom is replaced by an aryl radical, the reaction being performed under such conditions as to prevent any substantial polymerization.

6. The process which comprises causing a hydrocarbon containing two conjugated double linkages to react at an elevated temperature upon ethylene-$\alpha$-aceto-$\alpha$-carboxylic acid esters in which at least one hydrogen attached to the beta carbon atom is replaced by a hydrocarbon radical, the reaction being performed under such conditions as to prevent any substantial polymerization.

7. The process which comprises causing a hydrocarbon containing two conjugated double linkages to react at an elevated temperature upon ethylene-$\alpha$-aceto-$\alpha$-carboxylic acid esters in which at least one hydrogen attached to the beta carbon atom is replaced by an alkyl radical, the reaction being performed under such conditions as to prevent any substantial polymerization.

8. The products of the addition of one to two molecules of a hydrocarbon containing two conjugated C=C double linkages to one molecule of ethylene in which at least both hydrogens of one carbon atom are substituted by radicals containing a double bond in conjugation with the ethylene double bond, radicals with C=C double bonds being excluded, the reaction being performed under such conditions as to prevent any substantial polymerization.

KURT ALDER.
HANS-FERDINAND RICKERT.